No. 894,377. PATENTED JULY 28, 1908.
C. FILLER.
TIRE ARMOR OR PROTECTOR.
APPLICATION FILED NOV. 20, 1907.
2 SHEETS—SHEET 2.
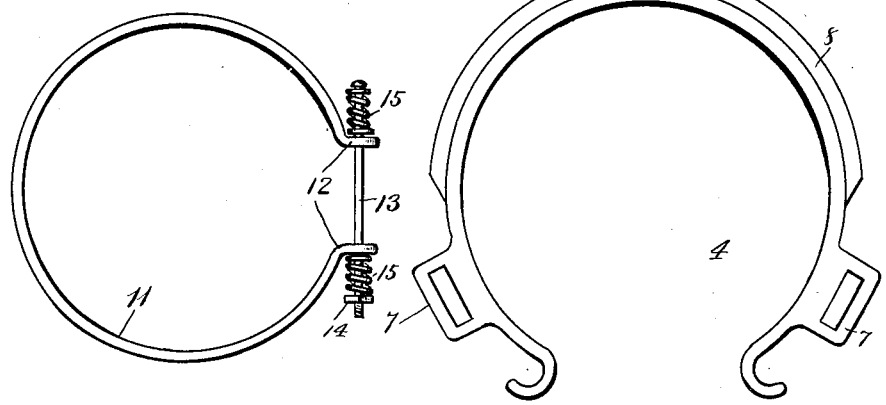

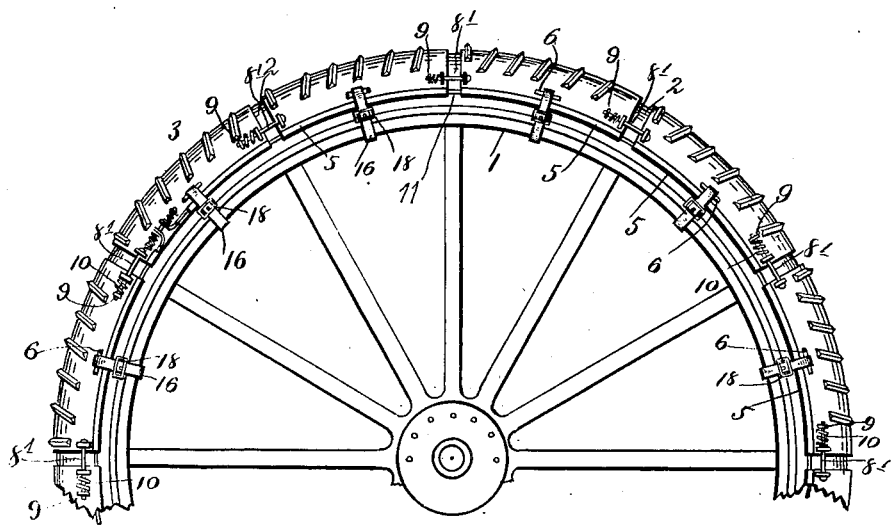
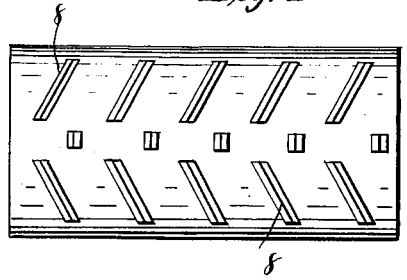
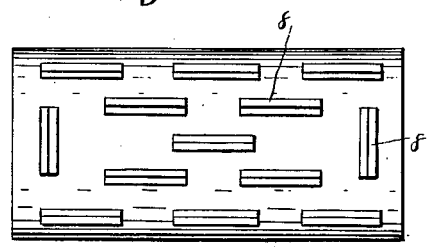

UNITED STATES PATENT OFFICE.

CHARLES FILLER, OF ST. JOHNSVILLE, NEW YORK.

TIRE ARMOR OR PROTECTOR.

No. 894,377.   Specification of Letters Patent.   Patented July 28, 1908.

Application filed November 20, 1907. Serial No. 403,056.

*To all whom it may concern:*

Be it known that I, CHARLES FILLER, a citizen of the United States, residing at St. Johnsville, in the county of Montgomery and State of New York, have invented certain new and useful Improvements in Tire Armors or Protectors, of which the following is a specification.

This invention has relation to new and useful improvements in tire armors or protectors, and has for its principal object the production of a simple and economical device of this kind which may be easily applied to a vehicle tire of any type, and when so applied will serve to effectually prevent puncturing of the same as well as obviate liability of slipping or skidding of the wheel to which the invention is applied when passing over smooth or uneven surfaces.

With the foregoing and other objects in view that will readily appear as the nature of the invention is better understood, the same resides in the novel features of construction, combination and arrangement of parts illustrated in the drawings and particularly pointed out in the appended claim.

In the accompanying drawings:—Figure 1 is a fragmentary view of a vehicle wheel of any ordinary or approved construction with the invention applied thereto. Fig. 2 is a detail plan view of one of the shoes or plates comprising the armor or protector, illustrating one method of forming the ribs constituting the anti-slipping devices on the outer surfaces of the shoes or plates. Fig. 3 is a similar view illustrating another method of arranging said ribs. Fig. 4 is an enlarged detail view of one of the connecting elements employed in carrying out the invention. Fig. 5 is an end view of one of the shoes or protector plates, the same being illustrated on an enlarged scale. Fig. 6 is an enlarged view in side elevation of one of the shoes or protector plates. Fig. 7 is a plan view of Fig. 6.

Referring to the drawings, which are for illustrative purposes only and therefore not drawn to scale, the numeral 1 indicates the felly of a portion or section of a wheel of any desired form or construction, and 2 a pneumatic tire positioned thereon.

3 indicates the tire armor or protector. This armor comprises a plurality of shoes or protector plates 4, adapted to be arranged circumferentially and in spaced relation over the tread portion of the tire. In carrying out the invention each of these plates are bent or turned inwardly to grasp the felly and tire, and then outwardly at opposite side edges to form side flanges 5, and has formed on its outer face or surface adjacent each end a side flange with a longitudinally slotted lug or extension 6 disposed in radial relation with the center of the wheel. Each of said shoes or plates has also formed on its outer face adjacent each side flange a vertical longitudinally slotted extension or lug 7 provided with a vertical slot, and has stricken up from or rigidly secured to its outer face a plurality of spaced ribs 8, which are of preferably V or triangular form in cross section, and constitute anti-slipping devices to prevent the wheel to which the invention is applied from slipping or skidding in passing over smooth or uneven surfaces. The ribs may be arranged in any suitable manner, three of the preferable methods employed being illustrated in Figs. 2, 3, 6 and 7.

In practice the several shoes or plates are yieldably connected at adjacent ends by connecting elements, preferably in the form of bolts $8^1$ adapted for insertion through the slots of the lugs or extensions 7, and nuts 9 adapted for screwed engagement with the thread ends of the same, resilient elements preferably in the form of coil springs 10 being arranged between the nuts and the lugs of the alternate shoes or plates.

By the above defined arrangement, it will be readily perceived that these shoes or plates will be susceptible of sufficient movement to follow the compression and expansion of the tire and to offer no interference to the resiliency of the tire.

To maintain the several shoes or plates in a central position on the tread portion of the tire and against relative sidewise or lateral displacement thereon a connecting element 11, of wire or other material having suitable flexibility, and of circular form, is arranged at each side of the tire and fitted in the flanges of the several shoes or plates. The ends of each of these elements are bent in a common direction to form space apertured end portions 12 and are yieldably connected by a connecting member in the form of a bolt 13 adapted for insertion through said end portions, and a nut 14 adapted for screwed engagement with the body of the bolt; a resilient element preferably in the form of a coil spring 15 being arranged between the head of the bolt and one of the end portions of the binding elements and one between the nut and other end portion thereof. It will be seen that the vertical slots in said extension 7, enables each shoe to move independently of the other shoes, when it comes in contact with an abrupt elevation or depression. This element 11, may be made in two or more sections and connected as shown in Fig. 4. By the above defined connecting means it will be seen that the binding or connecting wires will expand or contract to accommodate themselves to conditions. Said plates are caused to closely fit the tire by fastening straps or elements 16 attached at one end to fastening loops or members 6 formed on the shoes or plates at one side of the tire and having their free ends inserted through similar fastening loops formed on the shoes at the other side of the tire, buckles 18 or other equivalent fastening means being employed to fasten the free ends in position.

Having described my invention, what I claim as new and desire to protect by Letters Patent is—

In combination with a vehicle wheel and a pneumatic tire arranged thereon, an armor, comprising a plurality of shoes, adapted to fit the felly and tire, of said wheel, and having their inner and opposite edges turned up, forming flanges or troughs 5; yieldable circular wires 11, fitting in said troughs, or flanges 5, and yieldably connected at their ends by means of bolts 13, nuts 14 and springs 15, said yieldable wires adapted to hold said shoes on said felly and tire; extensions or lugs 7, each provided with a vertical slot, stricken up or rigidly secured near the ends and on the outer face of said shoes; bolts $8^1$, passing through the slots of said extensions; nuts 9, screwed on the threaded ends of said bolts; spiral springs 10, working between said extensions and said nuts, and straps 16, having one end secured to the lug 6, formed on said shoes, passing thence under the felly and tire of said wheel, with their opposite ends secured to the opposite lugs, said shoes provided with anti-skidding elevations stricken up or secured to the outer faces of said shoes, substantially as shown and described and for the purposes set forth.

In testimony whereof I affix my signature in presence of two witnesses.

CHARLES FILLER.

Witnesses:
 ERONI A. HANDY,
 JONATHAN VEDDER.